US011456671B2

(12) United States Patent
Aulagnier et al.

(10) Patent No.: US 11,456,671 B2
(45) Date of Patent: Sep. 27, 2022

(54) DISTRIBUTED CONTROL OF A VOLTAGE REGULATOR

(71) Applicants: NXP USA, Inc., Austin, TX (US); INSTITUT NATIONAL POLYTECHNIQUE DE TOULOUSE, Toulouse (FR)

(72) Inventors: Guillaume Jacques Léon Aulagnier, Toulouse (FR); Miguel Mannes Hillesheim, Toulouse (FR); Eric Pierre Rolland, Grepiac (FR); Philippe Goyhenetche, Fonsorbes (FR); Marc Michel Cousineau, Lavaur (FR)

(73) Assignees: NXP USA, Inc., Austin, TX (US); L'INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 0 days.

(21) Appl. No.: 17/109,977

(22) Filed: Dec. 2, 2020

(65) Prior Publication Data
US 2021/0175806 A1 Jun. 10, 2021

(30) Foreign Application Priority Data
Dec. 5, 2019 (EP) ..................................... 19306578

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05)

(58) Field of Classification Search
CPC .......................... H02M 3/1584; H02M 1/0025
See application file for complete search history.

(56) References Cited

U.S. PATENT DOCUMENTS 6,215,290 B1 * 4/2001 Yang ................... H02M 3/1584
 323/282
9,401,640 B2 7/2016 Karlsson et al.
(Continued)

OTHER PUBLICATIONS

Zhang, Xin et al; "MRVC and Its Tolerance Analysis for Microprocessor Power Management"; IEEE Power Electronic Specialists Conference PESC; pages (2006).
(Continued)

*Primary Examiner* — Alex Torres-Rivera

(57) ABSTRACT

A controller is disclosed for a voltage regulator module including a power unit and providing an output current, $I_{out}$, at an output voltage, $V_{out}$, from an input current/voltage and being configured for use in a multi-module voltage regulator having a neighbouring voltage regulator module having a respective output connected in parallel, the controller comprising: a reference voltage source for providing a reference voltage; a current balancing unit, configured to receive a respective output current from the or each neighbouring voltage regulator module and to determine an adjusted reference voltage, from the reference voltage and for balancing the output current with the at least one respective output current; and a control unit configured to use the adjusted reference voltage to control the voltage regulator module, to provide the output current at the output voltage from the input current at the input voltage, based on adaptive voltage positioning regulation.

15 Claims, 7 Drawing Sheets

(56) References Cited

U.S. PATENT DOCUMENTS

| | | | |
|---|---|---|---|
| 9,608,450 B2 | 3/2017 | Cousineau | |
| 10,432,088 B1* | 10/2019 | Chang | H02M 3/157 |
| 10,530,303 B2 | 1/2020 | May et al. | |
| 2011/0267019 A1* | 11/2011 | Krishnamurthy | H02M 3/1584 |
| | | | 323/283 |
| 2018/0050603 A1* | 2/2018 | Hand, III | H02M 3/285 |
| 2021/0028683 A1* | 1/2021 | Jiang | H02M 1/084 |

OTHER PUBLICATIONS

Cingoz, Fatih, et al., "Optimized Settings of Droop Parameters Using Stochastic Load Modeling for Effective DC Microgrids Operation", IEEE Transactions on Industry Applications, Mar. 1, 2017, pp. 1358-1371, vol. 53, No. 2, IEEE, Piscataway, NJ, USA.

Cousineau, Marc et al; "Fully Decentralized Modular Approach for Parallel Converter Control"; IEEE Applied Power Electronics Conference and Exposition; 7 pages (2013).

Kadlec, Josef et al; "Modular System of Converters with Interleaved Structure"; Proceedings of the 16th Int'l Conference on Mechatronics—Mechatronika; 6 pages (2014).

Kelly, Anthony et al; "Masterless Multirate Control of Parallel DC-DC Converters"; IEEE Applied Power Electronics Conference and Exposition, Palm Springs, CA, US; 5 pages (2010).

Le Bolloch, Mathieu et al; "New Masterless Modular Current-Sharing Technique for DC/DC Parallel Converters"; IEEE Power Electronics & Motion Control Conference, IEEE, Piscataway, NJ, USA; pages (Sep. 6, 2010).

Lu, Xiaonan et al; "An Improved Droop Control Method for DC Microgrids Based on Low Bandwidth Communication with DC Bus Voltage Restoration and Enhanced Current Sharing Accuracy"; IEEE Trans. On Power Electronics, IEEE, USA, vol. 29. No. 4: page (Apr. 1, 2014).

Nasirian, Vahidreza et al; "Distributed Cooperative Control of DC Microgrids"; IEEE Trans. On Power Electronics, IEEE, USA, vol. 30, No. 4; 16 pages (Apr. 1, 2015).

Zhang, Xin et al; "Monolithic/Modularized Voltage Regulator Channel"; IEEE Trans. On Power Electronics, vol. 22, No. 4; 15 pp. 1162-1176 (Jul. 2007) 2007.

Yao, K. et al; "Optimal Design of the Active Droop Control Method for the Transient Response"; IEEE Applied Power Electronics Conference and Expo, Miami Beach, FL, USA; pp. 718-723, vol. 2 (Feb. 9, 2013).

Zhang, Xin et al; "A Novel Distributed Control and Its Tolerance Analysis for Microprocessor Power Management"; IEEE Applied Power Electronics Conference and Exposition: 7 pages (2006).

* cited by examiner

DISTRIBUTED CONTROL OF A VOLTAGE REGULATOR

CROSS-REFERENCE TO RELATED APPLICATIONS

This application claims the priority under 35 U.S.C. § 119 of European patent application no. 19306578.6, filed Dec. 5, 2019 the contents of which are incorporated by reference herein.

FIELD

This disclosure relates to multi-module voltage regulators, and voltage regulator modules and control modules therefor.

BACKGROUND

Voltage regulators (VRs) supply a regulated voltage to other circuits or systems. A voltage regulator can be linear (linear regulator, LDO) or a switching mode power supply SMPS (DCDC converters, charge pumps).

The accuracy of the regulated voltage accuracy is directly proportional to the voltage reference. When the output current required is high, multiple converter legs, or modules, can be connected in parallel, as illustrated schematically in FIG. 1, which shows a multi-module voltage regulator system 100 having several regulator modules 110 each driven by the same control voltage supplied to a control input cntl. The outputs of the modules are combined to provide a current I to a load 120, at a voltage $V_{out}$. The voltage $V_{out}$ is provided to each module through a feedback loop.

This multi-module approach may provide for advantages such as scalability, improved thermal spreading, reduced electromagnetic interference (EMI), reduced filtering requirements, better transient response, and possible safety or fault tolerance mechanisms when a failing leg or module is identified and disabled. Conventional control methods use a centralized controller, either a separate unit, or in a mater/slave arrangement in which one of the modules is configured a master and has associated with it, the controller. The centralized controller or master provides a control voltage for the regulation operation. But this controller is a single point-of-failure, so typically the complete system fails if there is a failure in the controller.

Recently, methods have been proposed for decentralised, or distributed, control, which can improve the fault tolerance of the regulator. However, there remain a problem for improved accuracy of such voltage regulators.

SUMMARY

According to a first aspect of the present disclosure there is provided controller for a voltage regulator module including a power unit and providing, at an output, an output current, $I_{out}$, at an output voltage, $V_{out}$, from an input current at an input voltage, the voltage regulator module being configured for use in a multi-module voltage regulator having at least one neighbouring voltage regulator module having a respective output in connected in parallel with the output, the controller comprising: a reference voltage source for providing a reference voltage ($V_{ref}$); a current balancing unit, configured to receive a respective output current from each of the at least one neighbouring voltage regulator module and to determine an adjusted reference voltage, $V_{ref}'$, from the reference voltage and for balancing the output current with the at least one respective output current; and a control unit configured to use the adjusted reference voltage to control the voltage regulator module, to provide the output current at the output voltage from the input current at the input voltage, based on adaptive voltage positioning, AVP, regulation.

In one or more embodiments, the current balancing module is configured to determine a difference, the difference being a difference between the output current and the output current from a one neighbouring voltage regulator module, and to adjust the reference voltage in proportion to the difference to provide the adjusted reference voltage. The communication of the output current from the neighbouring voltage regulator module may be provided by a uni-directional link, or may be provided by a bi-directional link in the case that communication in one direction fails.

In other embodiments, the current balancing module is configured to determine a difference, the difference being a difference between the output current and the sum of half the output currents from each of two neighbouring voltage regulator modules, and to adjust the reference voltage in proportion to the difference to provide the adjusted reference voltage. The modules may typically be arranged in a daisy-chain, and then there is thus a communication path between the two direct neighbours of the voltage regulator module, and the module. This may typically be provided by bi-directional links.

In yet other embodiments, the current balancing module is configured to determine a difference, the difference being a difference between the output current and a weighted average of the output currents from a plurality of neighbouring voltage regulator modules, and to adjust the reference voltage in proportion to the difference to provide the adjusted reference voltage In one or more embodiments, wherein the control unit (532) is configured to control the voltage regulator module to provide the output current from the input current, and the adjusted reference voltage by a control loop having a finite feedback gain, H. This may be useful to achieve the correct output voltage in cases where the reference voltage is fixed or in which the output voltage is higher than the supply of the control module.

In one or more embodiments, the current balancing unit (550) is configured to adjust the reference voltage by the difference multiplied by a finite loop gain value, H,Rdiff to determine the adjusted reference voltage. Implementation of finite gain may assist in preventing, in operation, one controller from asserting a current on all the other controllers in the multi-module voltage regulator.

In one or more embodiments the control loop of the control unit has an infinite DC gain. Providing an infinite DC gain may be useful to ensure accurate or precise AVP regulation in steady-state situations: otherwise steady-state error may provide an offset—typically fixed—for the output voltage $V_{out}$.

In one or more embodiments the output voltage is determined, by voltage droop regulation, as the difference between the adjusted reference voltage divided by the feedback gain, and the output current multiplied by an output impedance, $R_{out}$: $V_{out}=V_{ref}'/H-R_{out} \cdot I_{out}$.

In one or more embodiments the controller is adapted for use in a multi-module voltage regulator comprising at least three voltage regulator modules operable with distributed control whose controllers are arranged in a logical daisy-chain, wherein the reference voltage source, the output current, the common output voltage and the respective output currents from the two immediately neighbouring voltage regulator modules in the daisy-chain are the only control inputs for controlling the output current. This may simplify the design, and may enhance the modularity of the controller.

In one or more embodiments the current balancing module is further configured to detect a failure of communication from a one of the two neighbouring voltage regulator modules, and in response to the failure of communication determine the difference to be a difference between the output current and the output current from the other of the two neighbouring voltage regulator modules.

According to a second aspect of the present disclosure, there is provided a voltage regulator module comprising a controller described above and further comprising a power unit having at least one controllable switch and an impedance. The power unit may integral with the control unit, or may be separate, in the sense of being on a separate chip of in a separate package, therefrom. According to a third aspect of the present disclosure, there is provided a multi-module voltage regulator, comprising at least two such voltage regulator modules, having respective controllers arranged in a logical daisy-chain, wherein the respective controller of each voltage regulator modules includes a separate reference voltage source, and the output voltage of the regulator modules is common. The at least one neighbouring voltage regulator module may be supplied from the same input voltage as the voltage regulator module. Conversely, in one of more other embodiments, the or each of the at least one neighbouring voltage regulator module may be supplied from one or more different input voltages. This may improve availability.

According to a fourth aspect of the present disclosure, there is provided a method of providing distributed control of a multi-module voltage regulator providing a common output voltage and comprising at least two voltage regulator modules and each having a respective controller, the controllers being arranged in a logical daisy-chain, the method comprising, in each voltage regulator module: providing a reference voltage by means of a reference voltage source; adjusting the reference voltage in dependence on a difference between an output current of the voltage regulator module and a weighted average of the respective output currents from at least one other voltage regulator module comprised in the multi-module voltage regulator by a finite gain feedback loop; and controlling the output current and the common output voltage from the adjusted reference voltage, by AVP regulation.

The weighted average may be the sum of half the output currents from each of two neighbouring voltage regulator modules.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer-readable medium, which may be a physical computer-readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
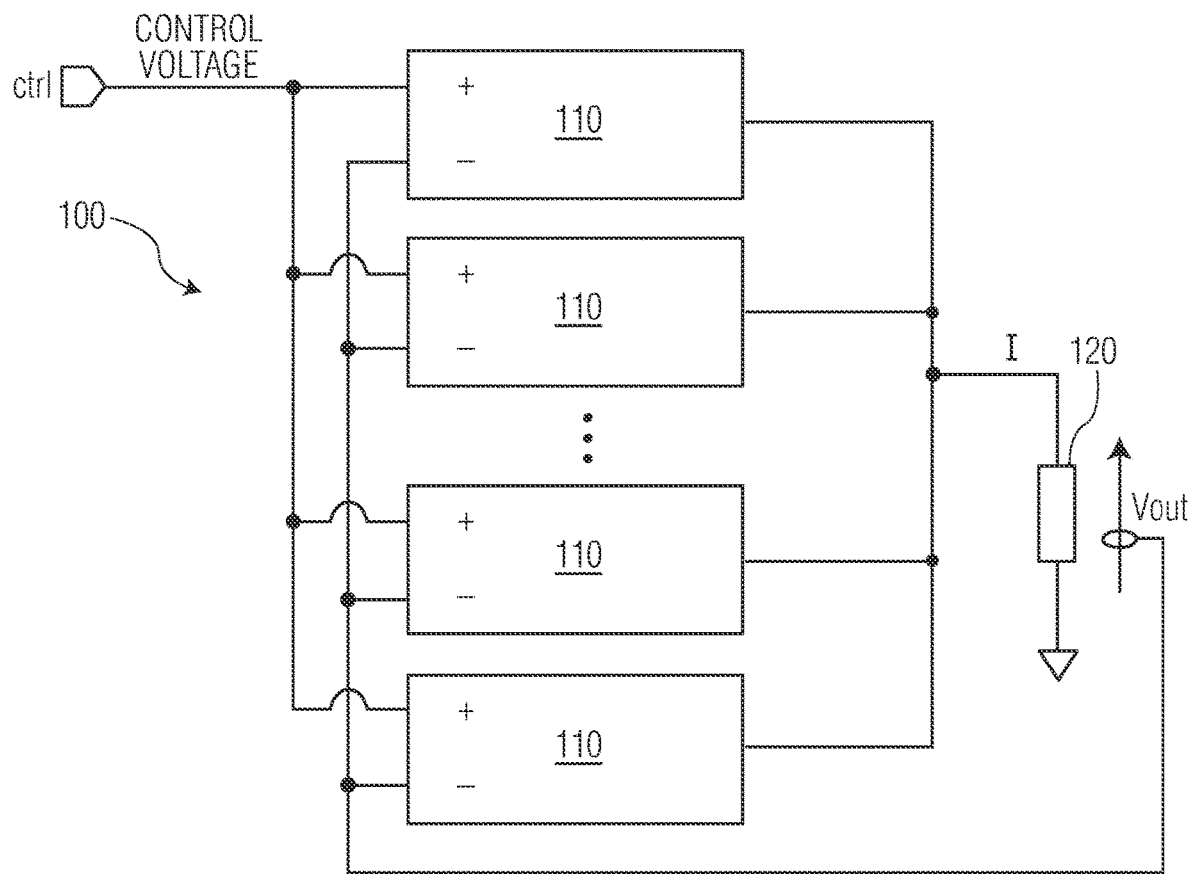
FIG. 1 shows, in schematic form, an arrangement of multiple regulators connected in parallel.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

An idealised voltage regulator may operate as a perfect voltage source—that is to say, the output voltage remains constant irrespective of the current supplied. However, the outputs of two such regulators could not be connected in parallel, since this would result in very high—theoretically infinite —currents flowing between the two, to try to offset any, even very small, differences in output voltage.

Figure 2:
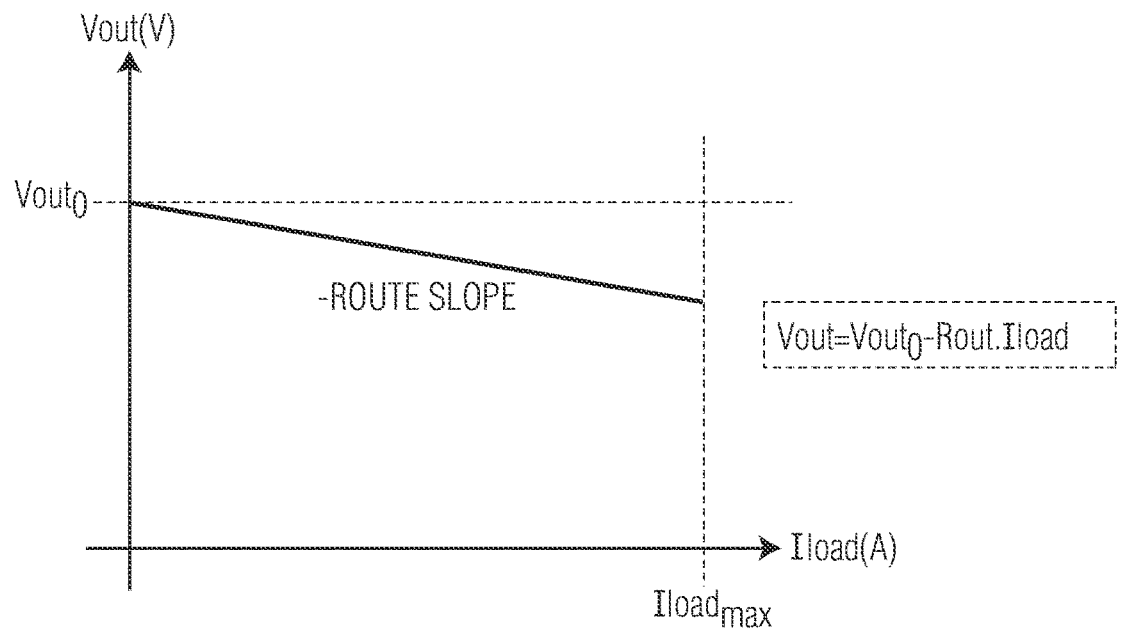
FIG. 2(a) illustrate a voltage-current characteristic showing the concept of voltage droop.

To enable two or more such regulator modules to be connected in parallel (or be "parallelized"), they must not be operated as ideal voltage sources. Instead, the concept of "voltage droop" is utilised. This is illustrated in FIG. 2. The regulator is designed to have a "virtual output impedance" $R_{out}$, such that the output voltage $V_{out}$ decreases, or "droops", from an initial value $V_{out0}$, with increasing load current Iload up to a maximum allowed load current $Iload_{max}$:

$$V_{out} = V_{out0} - R_{out} \cdot Iload \qquad (1)$$

The control of such voltage regulators may be described as being by "voltage droop regulation", which is also referred to as Adaptive Voltage Positioning (AVP) regulation. AVP allows parallel connection with well-controlled differential currents flowing from one module to another due to internal offsets or mismatches. AVP naturally provides some degree of current sharing and better transient response as well as improved system power efficiency, so that it is presently used in CPU/GPU (central processor unit/general processor unit) power supplies.

As will be discussed in more detail below, AVP regulation with multiple modules can be implemented with each module having its own reference voltage. The output voltage is then proportional to the average of the reference voltages. However, parallelizing with AVP typically provides only a poor level of current sharing. Current imbalance is given by mismatches from the reference voltages and the output droops (i.e. virtual output impedance). Therefore, some communication links are required to improve the current sharing. That is why distributed, or decentralized, controllers are typically configured to be modular with standard connections—which allows the use of an unlimited number of elements.

Figure 3A:
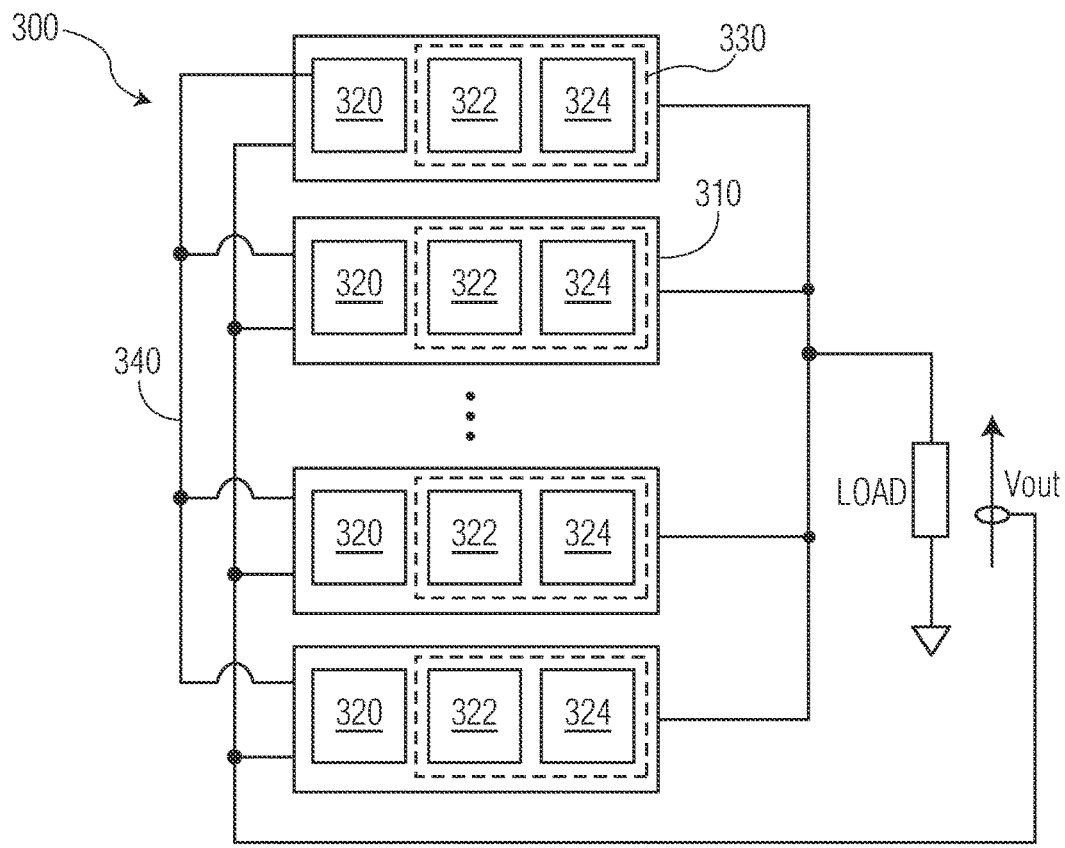
FIG. 3(a) shows an arrangement of multiple regulators connected in parallel with shared wired voltage references

Methods of improving the current sharing for multi-module VRs are known. One such method is averaging the reference voltage in a shared wire, as shown in FIG. 3. This figure shows a multi-module voltage regulator, having several regulator modules 310, each of which includes its own local voltage reference Vref 320 in addition to a control and power unit 330. The power and control unit 330 may have separate control unit 322 and power unit 324 as shown. The local voltage references are tied together by a shared wire 340.

Figure 3B:
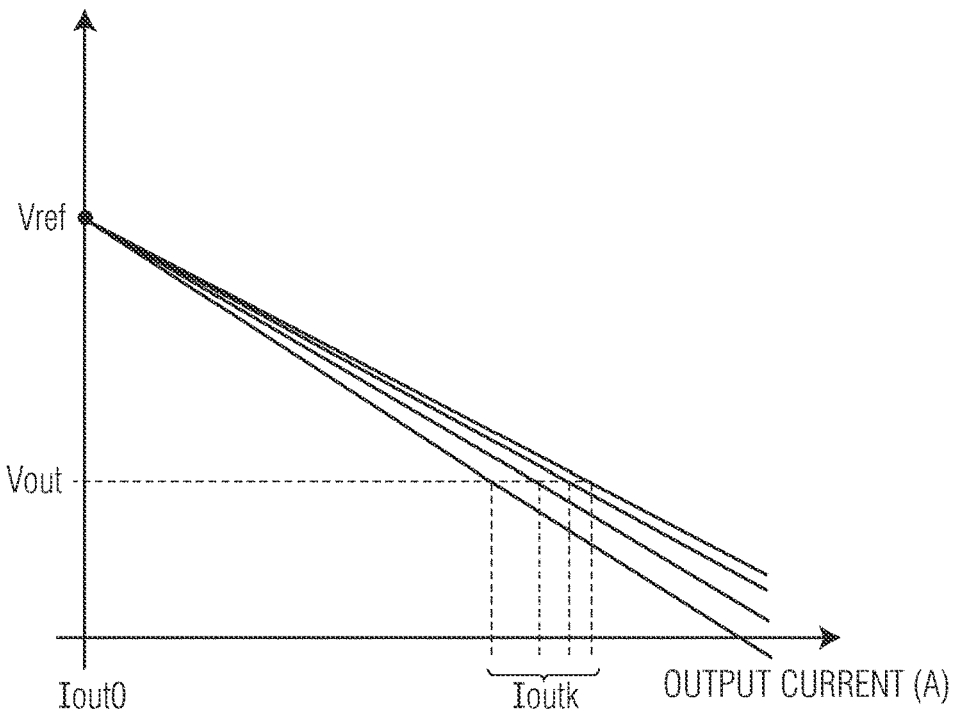
FIG. 3(b) illustrates the voltage-current characteristic of the modules of FIG. 3(a)

Such an approach cancels out differential currents, at the nominated output current $I_{out0}$, due to voltage reference mismatch, as shown in FIG. 3b, by the imposition of a common value of Vref; however, mismatches in the virtual output impendences of the modules, combined with droop mismatch, result in the modules providing a range of current outputs $I_{outk}$, from each of the modules at a different operational voltage $V_{out}$.

Shared wire approaches are in general not fault tolerant, since the shared wire is a single-point-of-failure, and such approaches still have poor current sharing because of the mismatches in the output currents resulting from the differences between each converter's output impedance. Further, although a single wire could be added for current balancing, this would also be a single point of failure (SPOF) and thus not fault-tolerant.

Figure 4A:
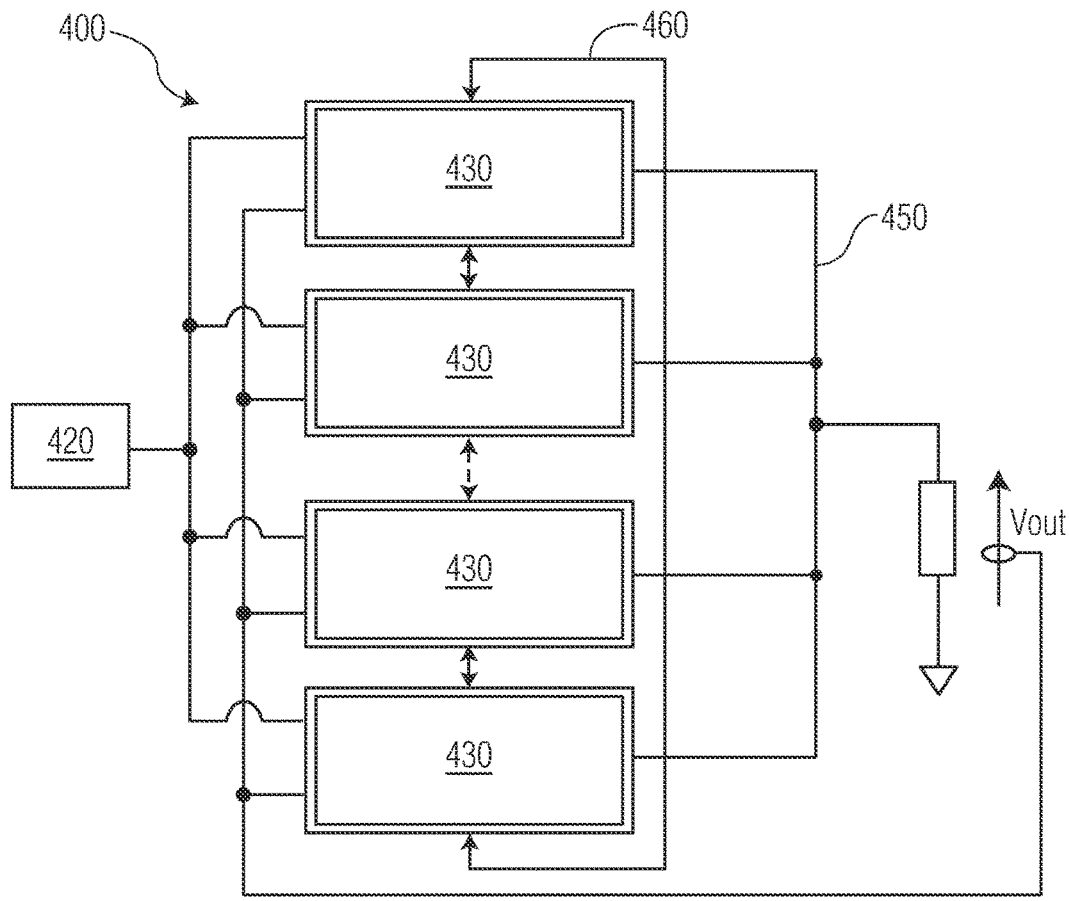
FIG. 4(a) shows an arrangement of multiple regulators connected in parallel with daisy-chain current communication.

An alternative approach has been proposed by one of the present inventors (Cousineau, Marc, and Zijian Xiao. "Fully Decentralized Modular Approach for Parallel Converter Control." In Applied Power Electronics Conference and Exposition (APEC), 2013 Twenty-Eighth Annual IEEE, 237-243. IEEE, 2013). This is illustrated in FIG. 4(a).

In this approach, the outputs from AVP converter-module control and power units 430 are connected in parallel at 450, and the currents are balanced using a circular chain, or daisy-chain, communication 460, such that each element balances the current with the average of its neighbours' current. This approach has two strengths: firstly it cancels out voltage offsets and droop mismatches, secondly it is fault tolerant on the current sharing—since there is no single wire, a fault on the inter-module communication 460 can be detected and isolated. However, it relies on a single voltage reference 420 that is shared with all modules, so it does not achieve high accuracy and fault tolerance on the reference.

Figure 4B:
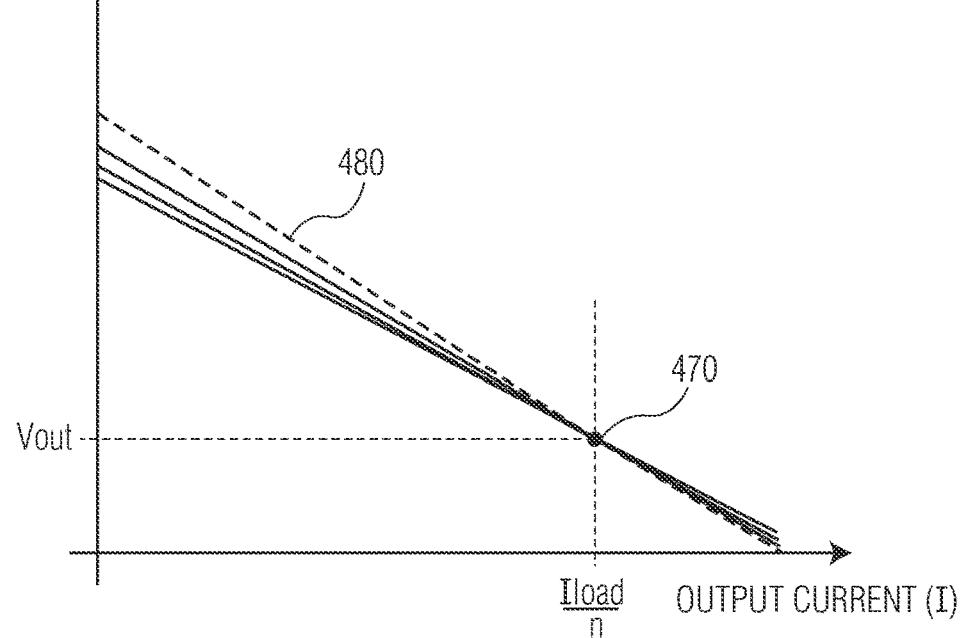
FIG. 4(b) illustrates the voltage-current characteristic of the modules of FIG. 4(a)

The voltage-current characteristic of the modules are shown in FIG. 4(b). In this approach, the modules can be controlled to each provide the same current Iload/n, at the operating voltage $V_{out}$, as seen at 470. It is noted that one of the modules acts as master, with its V-I characteristic 480, and thus this approach is not entirely fault-tolerant.

Figure 5:
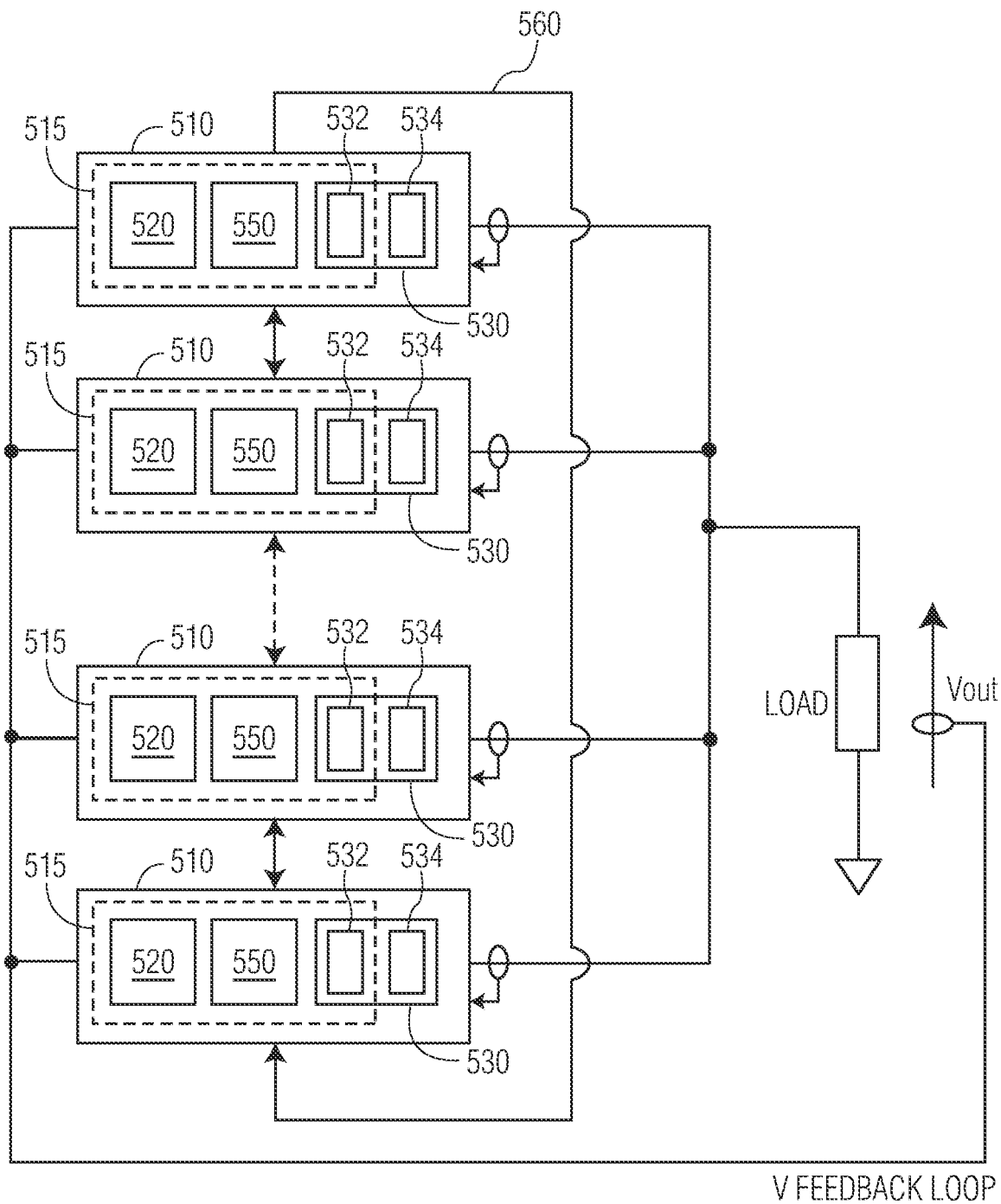
FIG. 5 shows an arrangement of multiple regulators connected in parallel with local voltage references and current sharing communication according to one or more embodiments.

In contrast to the known approaches, embodiments of the present disclosure may provide for truly distributed control, with fault tolerance, and the potential for high accuracy. Once such embodiment is shown in FIG. 5, which shows an arrangement 500 of multiple regulator modules 510 connected in parallel, each with a local voltage reference 520 and control and power unit 530, and current sharing, or daisy-chain, communication 560. The control and power unit may be subdivided, as shown, into a control unit 532, which controls the voltage regulation, and a power unit 534, which regulates the voltage. As non-limiting examples, in a linear regulator the power unit 534 may include a power-dissipating impedance, whereas in a switched mode power converter the power unit may includes one or more switches and an impedance.

In this arrangement, each of the regulator modules 510 may be identical, and there is no artificial limit to the number which may be combined. The output from the modules are connected in parallel. Each module regulates independently its the output voltage, using its own reference voltage 520. Each module has a non-null virtual output impedance $R_{out}$, to facilitate voltage droop, or AVP, regulation as discussed above. A common output voltage value $V_{out}$ is proportional to the average of the voltage references. The averaging occurs automatically at the output without a need for added communication between the modules, as will be explained in more detail below. Using an average of several voltage references may yield an accuracy that is improved compared to the accuracy of one module; this benefit may further increase with an increasing number of modules. A current sharing loop 560 is based on local current sensing 565 of the current output from each module, and typically provides communication of current values between neighbouring modules along a circular chain, or daisy-chain. An finite DC loop gain H, but having an infinite output resistance $R_{out}$ such that $H*R_{out}$ is infinite, is further used to reduce differential currents while preserving the output voltage accuracy. That is to say, in steady state (or "DC") the control loops force the output currents to be the same.

The control will now be explained, with reference to FIGS. 6 to 9.

Figure 6:
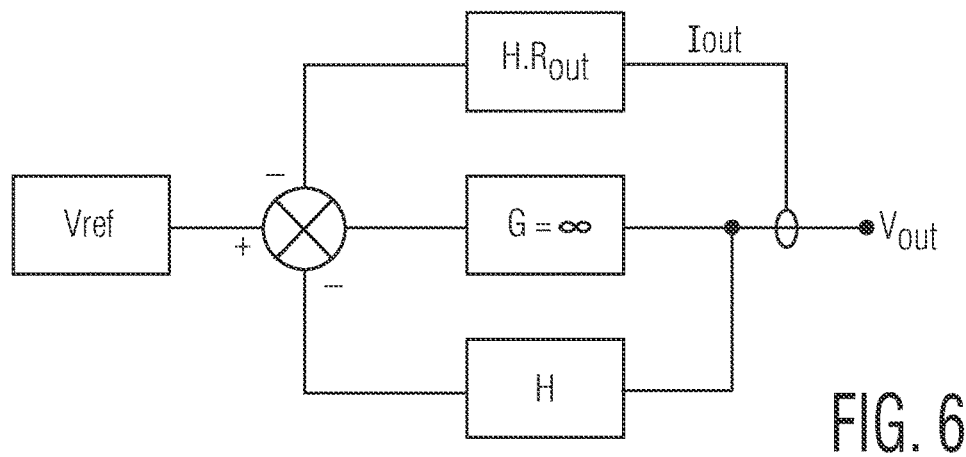
FIG. 6 shows, schematically, the DC operation of a module according to one or more embodiments.

FIG. 6 shows, schematically, the main control loop, in DC operation, of a module according to one or more embodiments. Each module comprises a voltage reference $V_{ref}$, and a regulation loop with non-null output impedance. Various forms of voltage reference, such as a band-gap reference, will be known to the skilled person. The output impedance $R_{out}$ is determined by a current loop with local current sensing of the output current. The loop gain G shows a high DC gain—typically greater than 1000; which is effectively an infinite DC gain. Feedback gain H defines the ratio between the reference voltage $V_{ref}$ and the output voltage $V_{out}$. Then:

$$H \cdot V_{out} = V_{ref} - H \cdot R_{out} \cdot I_{out} \Longrightarrow V_{out} = \frac{V_{ref}}{H} - R_{out} \cdot I_{out} \qquad (2)$$

Figure 7:
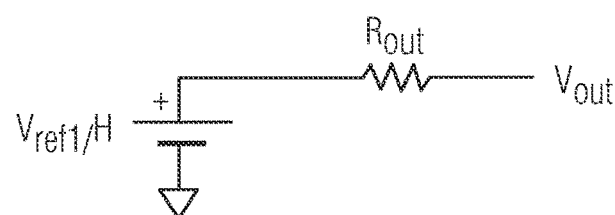
FIG. 7 shows a DC model of a single module.
Figure 8:
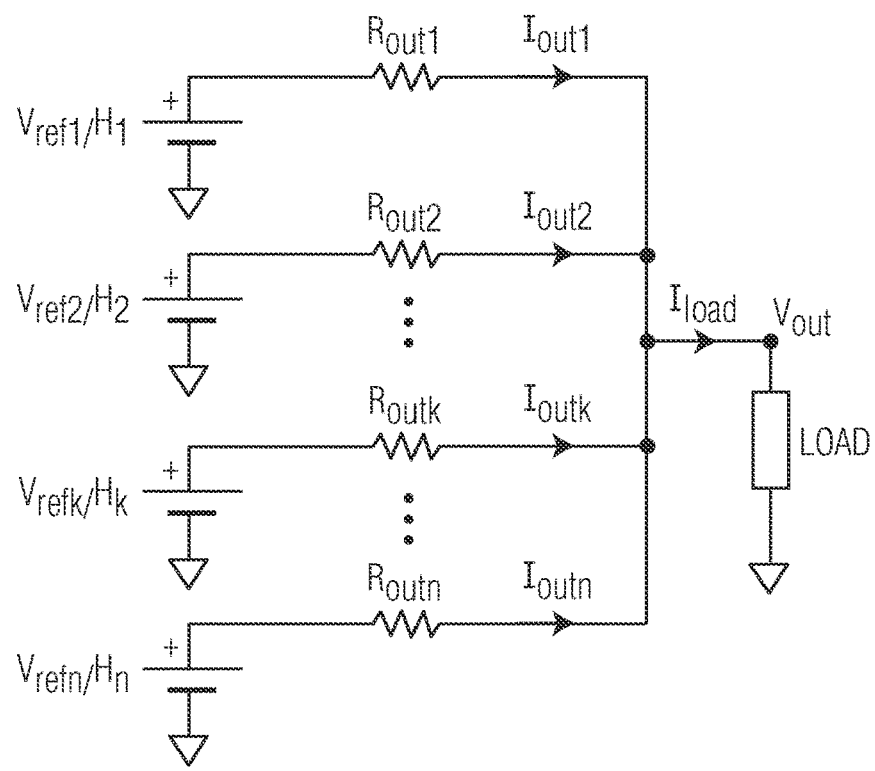
FIG. 8 shows a DC model of n modules connected in parallel.

The DC operation of a single module can be simplified and modelized with a voltage source $V_{ref}/H$, followed by an output impedance, as illustrated in FIG. 7. An arrangement of "n" modules gives the association of "n" voltage sources connected together to the output node through their output impedance, as illustrated in FIG. 8, where, "n" is an integer greater or equal to two.

The following relationships can then be seen:

For all of the local references, $V_{ref_k}$, k=1 to n, the following holds:

$$\forall k \in [1:n] V_{ref_k} = \langle V_{ref} \rangle \cdot (1 + \varepsilon_{vref_k}) \quad (3)$$

where:

$$\langle V_{ref} \rangle = \frac{1}{n} \sum_{k=1}^{n} V_{(ref)k} \text{ and } \sum_{k=1}^{n} \varepsilon_{vref_k} = 0 \quad (4)$$

The output impedances of the modules are, similarly:

$$\forall k \in [1:n] R_{out_k} = \langle R_{out} \rangle \cdot (1 + \varepsilon_{rout_k}) \quad (5)$$

where:

$$\langle R_{out} \rangle = \frac{1}{n} \sum_{k=1}^{n} R_{out_k} \text{ and } \sum_{k=1}^{n} \varepsilon_{rout_k} = 0 \quad (6)$$

Moreover, the local feedback gains can be shown to be:

$$\forall k \in [1:n] H_k = \langle H \rangle \cdot (1 + \varepsilon_{h_k}) \quad (7)$$

where $$\langle H \rangle = \frac{1}{n} \sum_{k=1}^{n} H_k \text{ and } \sum_{k=1}^{n} \varepsilon_{h_k} = 0 \quad (8)$$

And finally, the local output currents are:

$$\forall k \in [1:n] I_{out_k} = \langle I_{out} \rangle \cdot (1 + \varepsilon_{Iout_k}) \quad (9)$$

where $$\langle I_{out} \rangle = \frac{1}{n} \sum_{k=1}^{n} I_{out_k} = \frac{I_{load}}{n} \text{ and } \sum_{k=1}^{n} \varepsilon_{Iout_k} = 0 \quad (10)$$

From the above, it can be shown that the output voltage $V_{out}$ is proportional to the average of the voltage references:

$$I_{load} = \sum_{k=1}^{n} I_{out_k} = \sum_{k=1}^{n} \frac{V_{ref_k} / H_k - V_{out}}{R_{out_k}} \quad (11)$$

so that (equation 12)

$$I_{load} = \frac{\langle V_{ref} \rangle}{\langle H \rangle \cdot \langle R_{out} \rangle} \sum_{k=1}^{n} \frac{(1 + \varepsilon_{vref_k})}{(1 + \varepsilon_{h_k}) \cdot (1 + \varepsilon_{rout_k})} - \frac{V_{out}}{\langle R_{out} \rangle} \cdot \sum_{k=1}^{n} \frac{1}{(1 + \varepsilon_{rout_k})}$$

that is:

$$I_{load} = \frac{n \cdot \langle V_{ref} \rangle}{\langle H \rangle \cdot \langle R_{out} \rangle} - \frac{n \cdot V_{out}}{\langle R_{out} \rangle} \quad (13)$$

and finally $$V_{out} = \frac{\langle V_{ref} \rangle}{\langle H \rangle} - \frac{\langle R_{out} \rangle}{n} \cdot I_{load} \quad (14)$$

In other words, the output reference is proportional to the average of the local references and the output droop is also proportional to the average of the local droops.

Differential Currents:

Potential mismatches between modules (voltage references $V_{ref}$, feedback ratio H, output impedance $R_{out}$) generate undesirable differential currents (current flowing from a module to another, and thus not transferred to the load). Equation (16) below describes the differential current attached to module "k" as a function of small shifts observed in the reference voltage value, feedback gain value and output impedance value. Differential currents are limited because the output impedance is not null. Equation (18) below shows that the bigger the output resistance is, the lower are the differential currents. However, a circuit for reducing the differential currents may be desirable, especially if choosing an output impedance of high value is not possible for the application.

Differential current in one module can be described through:

$$I_{out_k} - \frac{I_{load}}{n} = \quad (15)$$

$$\frac{\frac{V_{ref_k}}{H_k} - V_{out}}{R_{out_k}} - \frac{I_{load}}{n} = \frac{\langle V_{ref} \rangle \cdot (1 + \varepsilon_{vref_k}) - \langle H \rangle \cdot (1 + \varepsilon_{h_k}) \cdot V_{out}}{\langle H \rangle \cdot (1 + \varepsilon_{h_k}) \cdot \langle R_{out} \rangle (1 + \varepsilon_{rout_k})} - \frac{I_{load}}{n}$$

from which it follows that $$I_{out_k} - \frac{I_{load}}{n} = \quad (16)$$

$$\frac{\langle V_{ref} \rangle}{\langle H \rangle \cdot \langle R_{out} \rangle} \cdot \frac{(1 + \varepsilon_{vref_k})}{(1 + \varepsilon_{h_k}) \cdot (1 + \varepsilon_{rout_k})} - \frac{V_{out}}{\langle R_{out} \rangle} \cdot \frac{1}{(1 + \varepsilon_{rout_k})} - \frac{I_{load}}{n}$$

Using a first order approximation gives:

$$I_{out_k} - \frac{I_{load}}{n} \approx \frac{\frac{\langle V_{ref} \rangle}{\langle H \rangle} - V_{out}}{\langle R_{out} \rangle} + \quad (17)$$

$$\frac{\langle V_{ref} \rangle}{\langle H \rangle \cdot \langle R_{out} \rangle} \cdot \frac{(1 + \varepsilon_{vref_k})}{(1 + \varepsilon_{h_k}) \cdot (1 + \varepsilon_{rout_k})} - \frac{V_{out}}{\langle R_{out} \rangle} \cdot \frac{1}{(1 + \varepsilon_{rout_k})} - \frac{I_{load}}{n}$$

From (15) to (17), it follows that $$I_{out_k} - \frac{I_{load}}{n} \approx \frac{(\varepsilon_{h_k} + \varepsilon_{rout_k} - \varepsilon_{vref_k}) \cdot \langle V_{ref} \rangle - \varepsilon_{rout_k} \cdot \langle H \rangle \cdot V_{out}}{\langle H \rangle \cdot \langle R_{out} \rangle} \quad (18)$$

Equation (18) can be rewritten as:

$$I_{out_k} - \frac{I_{load}}{n} \approx \frac{(\varepsilon_{h_k} - \varepsilon_{vref_k}) \cdot \langle V_{ref} \rangle + \varepsilon_{rout_k}[\langle V_{ref} \rangle - \langle H \rangle \cdot V_{out}]}{\langle H \rangle \cdot \langle R_{out} \rangle} \quad (18a)$$

This shows that the impact of $\varepsilon_{vref_k}$ the current error is much higher than the impact of $\varepsilon_{rout_k}$ because $\langle V_{ref} \rangle$ tends to be 10 times bigger than the droop at full load: $[\langle V_{ref} \rangle - \langle H \rangle \cdot V_{out}]$.

Typically, the droop may be as little as one tenth, or less, of Vref. So it is in general preferable to match Vref to reduce, $\varepsilon_{vref_k}$ Current Sharing:

According to embodiments of the present disclosure, a current sharing—or current matching—circuit is implemented, to reduce differential currents. The current sharing circuit corrects the local reference voltage from sensing the local output current and comparing it with currents from other modules. The most convenient approach is to compare with the two immediately neighbouring modules, typically using bi-directional communication around a daisy-chain or circular chain). However, it is possible to compare with just a single neighbour (for instance, using uni-directional communication around the daisy-chain), or with additional, more remote, modules. An example of the latter would be a "leap-frog" communication chain in which each module would communicate with its immediate next-neighbours and its next-but-one neighbours, such that a k-th module communicates with, or more particularly receives current sense information from, modules (k−2), (k−1), (k+1) and (k=2). Conversely, in the bi-direction immediate neighbour arrangement, the k-th module receives current sense information from modules (k−1) and (k+1), whilst in the unidirectional communication, the k-th module receives current sense information from only the (k−1)th module.

Figure 9:
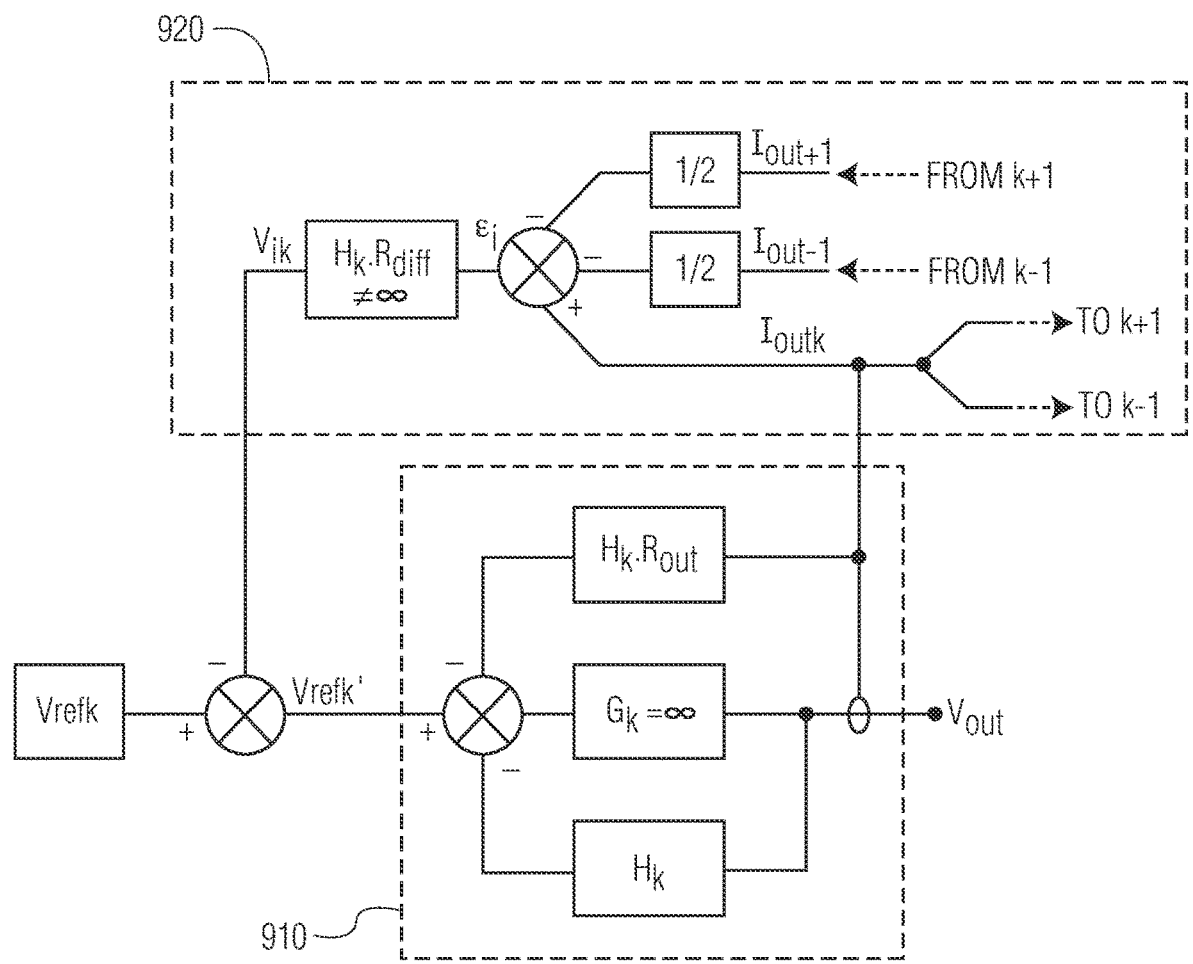
FIG. 9 shows the control scheme of a controller according to embodiments.

In embodiments in which the local output current is compared with the currents from with the two neighbouring modules, the average of those currents are typically used for the comparison: $(I_{k+1} + I_{k-1})/2$, as shown in FIG. 9. Conversely, in embodiments where the comparison is with just one neighbour, that neighbour's current is used directly $(I_{k-1})$. In general, a weighted average may be used:

$$\frac{w_1 \cdot I_1 + w_2 \cdot I_2 + \ldots w_{k-1} \cdot I_{k-1} + w_{k+1} \cdot I_{k+1} + \ldots + w_n \cdot I_n}{w_1 + w_2 + \ldots + w_{k-1} + w_{k+1} + \ldots + w_n}$$

where w1, w2 are weighting factors chosen to suit the application. In the above preferred cases, n=2 and $w_1=w_2=1$, or n=1 and $w_1=1$, respectively.

FIG. 9 shows, schematically, the control of a "k-th" voltage regulator module, according to embodiments of the present disclosure. The primary control loop 910 implements AVP or voltage droop regulation as discussed above. However, instead of controlling directly from the reference voltage $V_{refk}$, the control is carried out based on an adjusted reference voltage $V_{refk}'$. The adjusted reference voltage is determined by the current sharing, or current balancing, loop, 920. As shown, the current balancing loop uses the difference between the output current $I_{outk}$ from the local voltage regulator, and an average current from other voltage regulator modules in the multi-module voltage regulator—in this example, the mean of the currents $I_{outk+1}$, and $I_{outk-1}$, from the two neighbouring modules.

Proportional correction (finite DC gain) is applied in this current sharing loop.

The use of a finite DC gain (that is to say, as measured in Ohms, Hk·Rdiff $\stackrel{4}{\ne} \infty$ avoids impacting the main voltage loop accuracy: otherwise, one of the modules might go into saturation under this loop operation, and it could impose its current as a new reference for all the modules currents. That would result in a shifting of the sum of the output currents, so the output voltage would be offset from the average of the references, which would generally not be desirable.

With a finite DC gain in the current sharing loop, correction of the differential currents does not affect the accuracy of the output voltage, because the sum of the corrections from sharing operations is null as showed by equations (20) to (27) below.

It follows from the circular-chained property, that (eq19):

$$\sum_{k=1}^{n} \left( I_{out_k} - \frac{1}{2} I_{out_{k-1}} - \frac{1}{2} I_{out_{k+1}} \right) =$$

$$\sum_{k=1}^{n} (I_{out_k}) - \frac{1}{2} \sum_{k=1}^{n} (I_{out_k}) - \frac{1}{2} \sum_{k=1}^{n} (I_{out_k}) = 0 \text{ A}$$

And using a first order approximation, this results in:

$$\sum_{k=1}^{n} V_{i_k} = \sum_{k=1}^{n} H_k \cdot R_{diff} \cdot \left( I_{out_k} - \frac{1}{2} I_{out_{k-1}} - \frac{1}{2} I_{out_{k+1}} \right) = 0 \text{ V} \quad (20)$$

Calculation of the output voltage with the current sharing loop:

$$I_{load} = \sum_{k=1}^{n} \frac{\frac{(V_{ref_k} - V_{i_k})}{H_k} - V_{out}}{R_{out_k}}, \quad (21)$$

from which it follows that:

$$I_{load} = \frac{\langle V_{ref} \rangle}{\langle H \rangle \cdot \langle R_{out} \rangle} \sum_{k=1}^{n} \frac{(1 + \varepsilon_{vref_k})}{(1 + \varepsilon_{h_k}) \cdot (1 + \varepsilon_{rout_k})} - \quad (22)$$

$$\frac{1}{\langle H \rangle \cdot \langle R_{out} \rangle} \sum_{k=1}^{n} V_{i_k} - \frac{V_{out}}{\langle R_{out} \rangle} \cdot \sum_{k=1}^{n} \frac{1}{(1 + \varepsilon_{rout_k})}.$$

From (20) and (22) one gets:

$$V_{out} = \frac{\langle V_{ref} \rangle}{\langle H \rangle} - \frac{\langle R_{out} \rangle}{n} \cdot I_{load} \quad (23)$$

Calculation of the differential current with the correction:

$$I_{out_k} - \frac{I_{load}}{n} = \frac{\frac{(V_{ref_k} - V_{i_k})}{H_k} - V_{out}}{R_{out_k}} - \frac{I_{load}}{n}, \quad (24)$$

from which it follows that $$I_{out_k} - \frac{I_{load}}{n} = \frac{(\varepsilon_{h_k} + \varepsilon_{rout_k} - \varepsilon_{vref_k}) \cdot \langle V_{ref} \rangle}{\langle H \rangle \cdot \langle R_{out} \rangle} - \frac{(1 - \varepsilon_{rout_k} - \varepsilon_{h_k}) \cdot V_{i_k}}{\langle H \rangle \cdot \langle R_{out} \rangle} - \frac{\varepsilon_{rout_k} \cdot V_{out}}{\langle R_{out} \rangle} \quad (25)$$

$$V_{i_k} = H_k \cdot R_{diff}\left(I_{out_k} - \frac{I_{load}}{n}\right) \quad (26)$$

Equation (21) and (23) lead to:

$$I_{out_k} - \frac{I_{load}}{n} \approx \frac{(\varepsilon_{h_k} + \varepsilon_{rout_k} - \varepsilon_{vref_k}) \cdot \langle V_{ref} \rangle - \varepsilon_{rout_k} \cdot \langle H \rangle \cdot V_{out}}{\langle H \rangle \cdot (\langle R_{out} \rangle + R_{diff})} \quad (27)$$

Equation (27), compared with equation (18), shows that the introduction of the current sharing operation can reduce differential currents as if an additional output impedance Rdiff was added in the modules, while common mode operation is not affected (equation (23)).

It can thus be seen that embodiments according to the present disclosure may result in improved output voltage accuracy based on multiple reference voltages, reduced differential currents, and complete modular decentralized control with inter-module communication—typically along a daisy-chain or circular chain.

Figure 10:
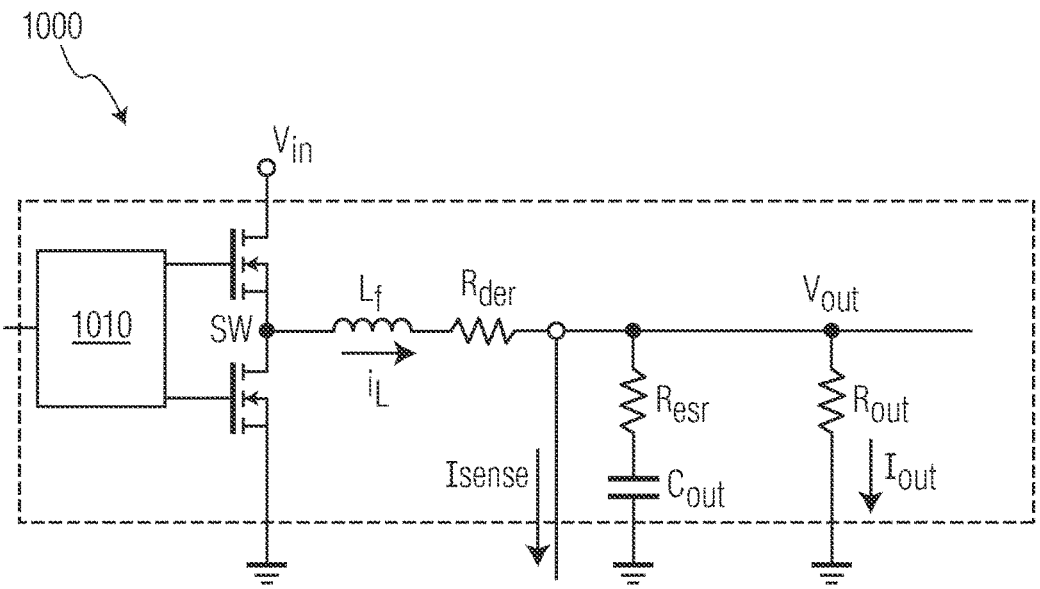
FIG. 10 shows a switched mode buck converter.

The control methods and apparatus disclosed herein may be used with linear regulators, or switched mode regulators. FIG. 10 shows, as a non-limiting example, one such voltage regulator. The figure shows a switched mode buck converter 1000, having a half-bridge node SW which is switched between a supply voltage Vin and ground, by PWM controller 1110, to switchedly supply current through an inductor Lf, to an output by a filter Rdcr,Resr,Cout, where Rdcr is the parasitic resistance of the inductor Lf, and Resr if the parasitic resistance of the capacitor Cout The current through the inductor provides an output voltage $V_{out}$, and is sensed (Isense).

Figure 11:
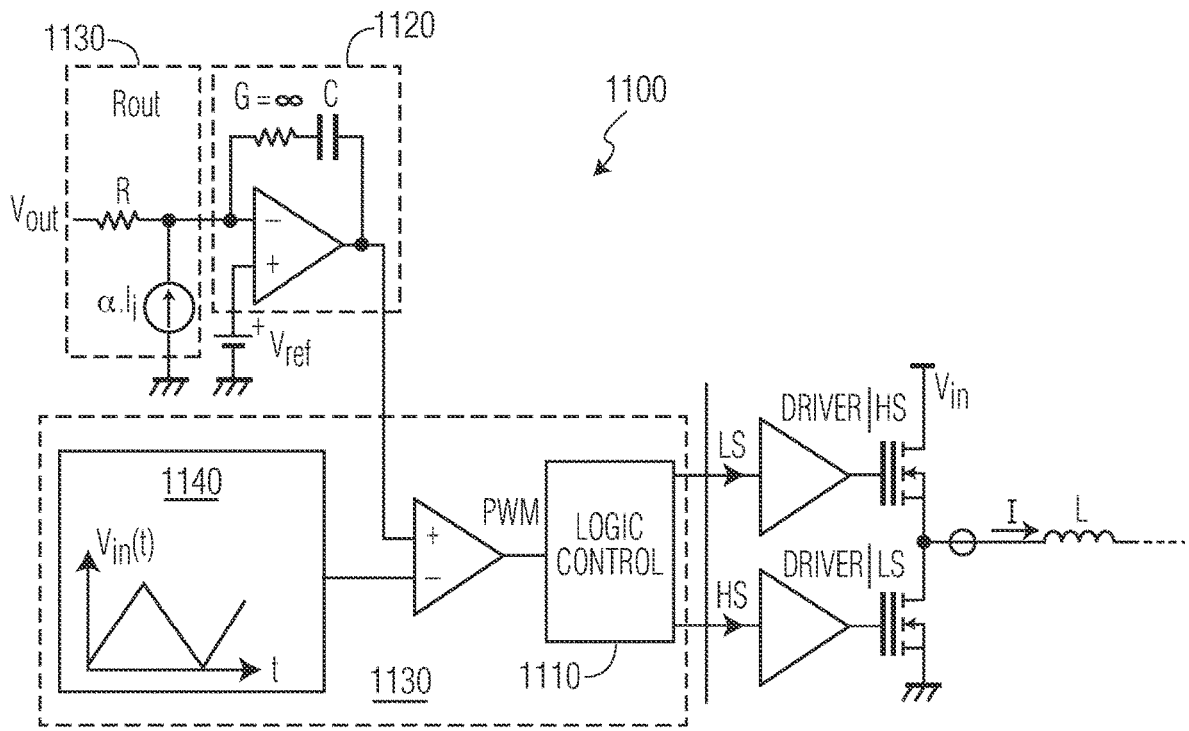
FIG. 11 shows a switched mode buck converter operating under AVP.

Control of such a VR, by AVP or voltage droop regulation, is illustrated in FIG. 11. FIG. 11 depicts a buck 1100 converter, the half-bridge switches of which are driven by high and low-side drivers Driver HS, and Driver_LS. The drivers are controlled by logic control 1110. The logic takes input from an oscillator 1140. An infinite gain (G=∞) DC control loop 1120 is provided with a feedback loop 1130, based on the output impedance Rout, to control the PWM signal in dependence on the output current $I_i$. The other details of such a buck converter will be familiar to the skilled person.

From reading the present disclosure, other variations and modifications will be apparent to the skilled person. Such variations and modifications may involve equivalent and other features which are already known in the art of voltage regulators, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE SIGNS 100,300, 400 multi-module voltage regulator
110 regulator module
120 load
310 regulator module with local reference voltage
320 local voltage reference
330 control and power unit
332 control unit
334 power unit
340 shared wired
420 single voltage reference
430 AVP converter module control and power unit
460 parallel connection between control and power unit outputs
460 daisy-chain communication
470 operating point $V_{out}$ with current Iload/n
480 master module V-I characteristic
500 arrangement of multiple regulator modules
510 regulator module
515 controller
520 local voltage reference
530 control and power unit
532 control unit
534 power unit
550 current balancing unit
560 current sharing, or daisy-chain communication
565 local current sensing
1000 buck converter
1010 PWM controller
1100 buck converter with AVP regulation
1110 logic control
1120 Infinite DC gain
1130 feedback loop based in output impedance
1140 oscillator

The invention claimed is:

1. A controller, for a first voltage regulator module including a power unit and providing, at an output, an output current, Iout, at an output voltage, Vout, from an input current at an input voltage, the first voltage regulator module being configured for use in a multi-module voltage regulator including a second voltage regulator module having an output connected in parallel with the output of the first voltage regulator module, the controller comprising:
a reference voltage source for providing a reference voltage (Vref);
a current balancing unit, configured to receive an output current from the second voltage regulator module, to determine an adjusted reference voltage, Vref', from the reference voltage, and to balance the output current with the output current from the second voltage regulator module; and a control unit configured to use the adjusted reference voltage to control the voltage regulator module and to provide the output current wherein the current balancing module is configured to determine a difference, the difference being a difference between the output current and the output current from the second voltage regulator module, and to adjust the reference voltage in proportion to the difference to provide the adjusted reference voltage.

2. The controller as claimed in claim 1, wherein the current balancing module is configured to determine a difference, the difference being a difference between the output current and the sum of half the output currents from the second voltage regulator module and a third voltage regulator module, and to adjust the reference voltage in proportion to the difference to provide the adjusted reference voltage.

3. The controller as claimed in claim 2, wherein the current balancing module is further configured to detect a failure of communication from either the second voltage regulator module or the third voltage regulator module, and in response to the failure of communication determine the difference to be a difference between the output current and the output current from the other of either the second voltage regulator module or the third voltage regulator module.

4. The controller as claimed in claim 1, wherein the current balancing module is configured to determine a difference, the difference being a difference between the output current and a weighted average of the output currents from the second voltage regulator module and a third voltage regulator module, and to adjust the reference voltage in proportion to the difference to provide the adjusted reference voltage.

5. The controller as claimed in claim 1 wherein the control unit is configured to control the voltage regulator module to provide the output current from the input current, and the adjusted reference voltage by a control loop having a finite feedback gain, H.

6. The controller as claimed in claim 5 wherein the control loop of the control unit has an infinite DC gain.

7. The controller of claim 6: further comprising the voltage regulator module; and wherein the controller is embedded in the voltage regulator module.

8. The controller of claim 6: wherein the controller is embedded in the multi-module voltage regulator including the first and second voltage regulator modules having respective controllers arranged in a logical daisy-chain, wherein the respective controller of each voltage regulator modules includes a separate reference voltage source, and the output voltage of the regulator modules is common.

9. The controller as claimed in claim 1, wherein the current balancing unit is configured to adjust the reference voltage by the difference multiplied by a finite loop gain value, H,Rdiff to determine the adjusted reference voltage.

10. The controller as claimed in claim 9, wherein the output voltage is determined, by voltage droop regulation, as the difference between the adjusted reference voltage divided by the feedback gain, and the output current multiplied by an output impedance, Rout:

$$Vout=Vref'/H-Rout \cdot Iout.$$

11. The controller as claimed in claim 1:
wherein the controller is embedded in a multi-module voltage regulator including at least three voltage regulator modules operable with distributed control whose controllers are arranged in a logical daisy-chain, and wherein the reference voltage source, the output current, the common output voltage and the respective output currents from two immediately neighbouring voltage regulator modules in the daisy-chain are the only control inputs for controlling the output current.

12. The voltage regulator module comprising the controller as claimed in claim 1, and further comprising the power unit having at least one controllable switch and an impedance.

13. The voltage regulator module as claimed in claim 12, wherein the second voltage regulator module is supplied from the input voltage.

14. A controller, for a first voltage regulator module including a power unit and providing, at an output, an output current, Iout, at an output voltage, Vout, from an input current at an input voltage, the first voltage regulator module being configured for use in a multi-module voltage regulator including a second voltage regulator module having an output connected in parallel with the output of the first voltage regulator module, the controller comprising:

a reference voltage source for providing a reference voltage (Vref);

a current balancing unit, configured to receive an output current from the second voltage regulator module, to determine an adjusted reference voltage, Vref', from the reference voltage, and to balance the output current with the output current from the second voltage regulator module; and a control unit configured to use the adjusted reference voltage to control the voltage regulator module and to provide the output current;

wherein the current balancing module is configured to determine a difference, the difference being a difference between the output current and a weighted average of the output currents from the second voltage regulator module and a third voltage regulator module, and to adjust the reference voltage in proportion to the difference to provide the adjusted reference voltage.

15. A controller, for a first voltage regulator module including a power unit and providing, at an output, an output current, Iout, at an output voltage, Vout, from an input current at an input voltage, the first voltage regulator module being configured for use in a multi-module voltage regulator including a second voltage regulator module having an output connected in parallel with the output of the first voltage regulator module, the controller comprising:

a reference voltage source for providing a reference voltage (Vref);

a current balancing unit, configured to receive an output current from the second voltage regulator module, to determine an adjusted reference voltage, Vref', from the reference voltage, and to balance the output current with the output current from the second voltage regulator module; and a control unit configured to use the adjusted reference voltage to control the voltage regulator module and to provide the output current;

wherein the controller is embedded in a multi-module voltage regulator including at least three voltage regulator modules operable with distributed control whose controllers are arranged in a logical daisy-chain; and wherein the reference voltage source, the output current, the common output voltage and the respective output currents from two immediately neighbouring voltage regulator modules in the daisy-chain are the only control inputs for controlling the output current.

* * * * *